United States Patent

Hwang

[11] Patent Number: 5,178,758
[45] Date of Patent: Jan. 12, 1993

[54] BIOCHEMICAL WATER FILTER

[76] Inventor: Ching F. Hwang, 75, Jin Wu Rd., Fon Shan City, Kaohsiung Hsien, Taiwan

[21] Appl. No.: 906,355

[22] Filed: Jun. 30, 1992

[51] Int. Cl.$^5$ .............................. C02F 1/32; C02F 3/10
[52] U.S. Cl. ............................ 210/256; 210/195.1;
210/205; 210/259; 210/260; 210/336; 210/443;
210/615; 210/748; 210/169; 210/760; 435/297;
435/300; 435/311; 422/24; 422/186.3
[58] Field of Search .............. 210/760, 194, 195.1,
210/205, 259, 260, 256, 443, 336, 615, 748, 169;
435/299, 300, 311; 422/24, 186.3

[56] References Cited

U.S. PATENT DOCUMENTS 4,214,962 7/1980 Pincon ............................ 422/186.3
4,416,993 11/1983 McKeown ........................ 210/615
4,694,179 9/1987 Lew et al. ...................... 422/186.3
4,728,368 3/1988 Pedziwiatr ....................... 210/748
4,766,321 8/1988 Lew et al. ...................... 210/760

Primary Examiner—Stanley S. Silverman
Assistant Examiner—Thomas M. Lithgow
Attorney, Agent, or Firm—Jacobson, Price, Holman & Stern

[57] ABSTRACT

A biochemical water filter comprising a cylindrical shell, a solar light tube and several ultraviolet tubes disposed in the shell so as to cultivate nitric bacteria to get rid of harmful bacteria with help of the light tubes for purifying water used in an aquarium, and a plurality of filtering plates for useful bacteria to fasten and grow thereon and for filtering water.

1 Claim, 4 Drawing Sheets

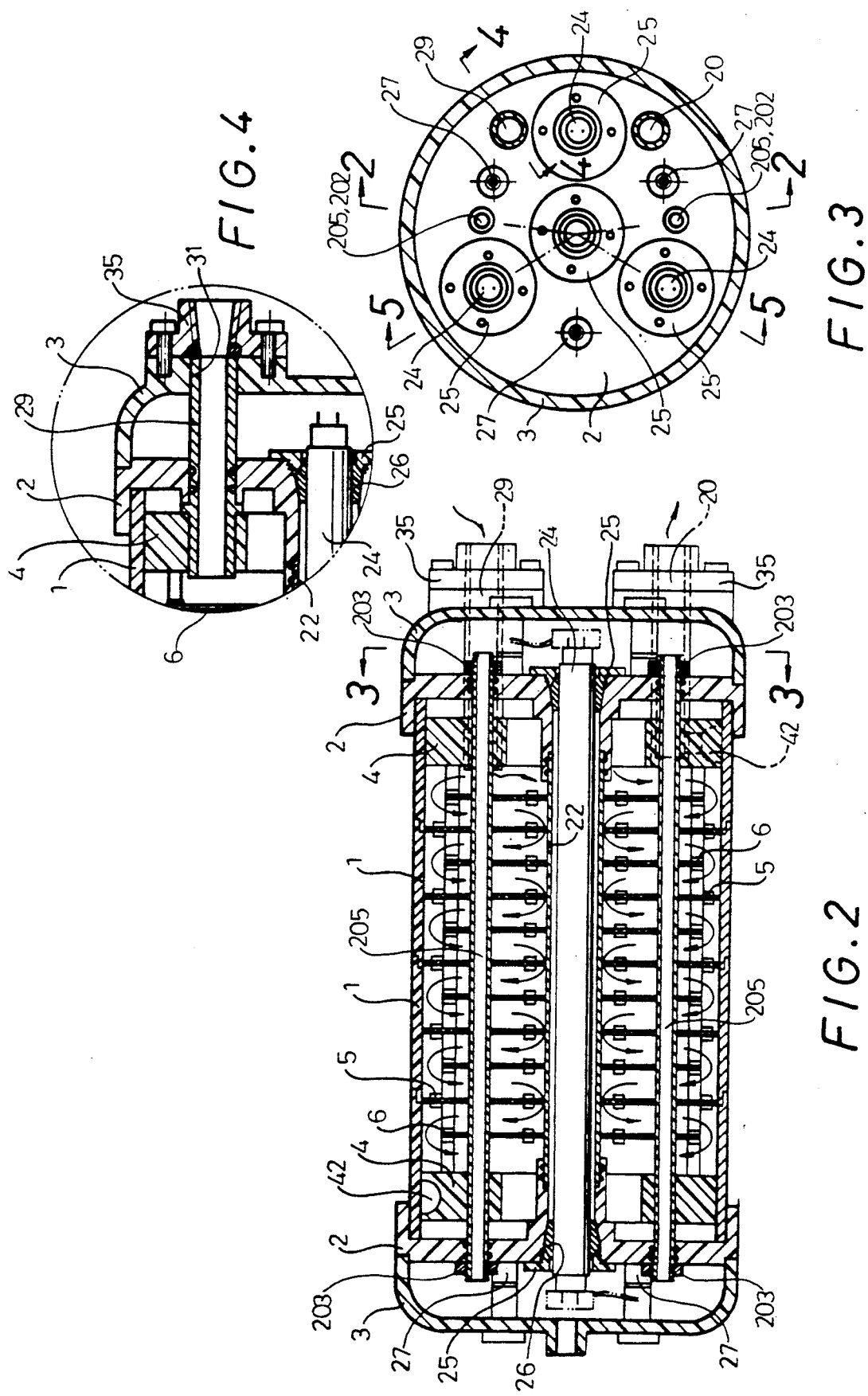

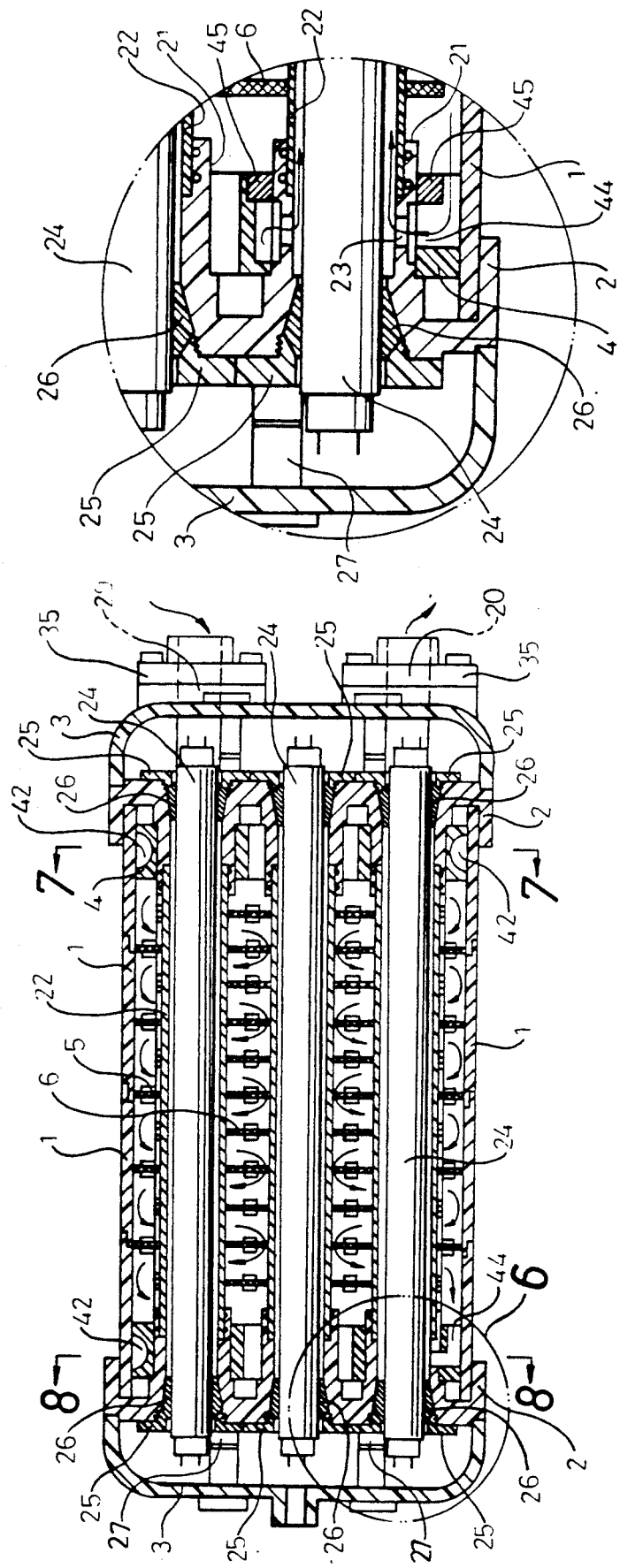

BIOCHEMICAL WATER FILTER

BACKGROUND OF THE INVENTION

A conventional aquarium for keeping fish, especially tropical fish, for enjoyment may have its water deteriorated by poisonous substance such as nitrate and nitrite produced by rotten excessive food and excessive fish waste. Although it is a known fact the nitric bacteria can perform nitrification to get rid of nitrogen, nitrate, nitrite, in water. But if the water in an conventional aquarium should contain excessive poisonous substance such as nitrate, nitrite for nitric bacteria therein to consume, fish therein would get disease, and die if worst, to a resultant loss to a grower. Some growers often put nitric bacteria in an awuarium to promote nitrification so as to keep balance of biological environment therein, and this traditional method may be a little effective in keeping a neutral balance of nitrate, nitrite, and nitrogen. Nevertheless, nitric bacteria may fasten on glass walls of an aquarium smearing them, and then it is hard to look through the glass to enjoy watching at fish therein.

SUMMARY OF THE INVENTION

The object of this invention is to provide a biochemical water filter that can purify water in an aquarium by providing several ultraviolet light tubes, a solar light tube and a plurality of filtering plates so that nitric bacteria can propagate on the filtering plates for performing nitrification, the solar light tube can assist propagation of the nitric bacteria and the ultraviolet light tubes can sterilize poisonous bacteria in water in an aquarium.

This invention, a biochemical water filter, comprises a cylindrical shell, two inner caps to be fixed at both open sides of the shell, and two outer caps to cover on the inner caps to form a hollow watertight space for both ends of light tubes to extend therein so as to connect with electric wires. Tubular posts are provided between both inner and outer caps, having inner cavities for receiving ends of transparent tubes, in which the lighttubes are to be disposed. The tubular posts have water holes for water to flow and out, combined with a separating disc. A plurality of filtering plates are arranged inside the shell between both separating discs, which have water guide routes, through holes so that water coming in the shell can flow therein in one direction only so as to be filtered and sterilized.

BRIEF DESCRIPTION OF THE DRAWINGS

This invention will now be described in detail with reference to accompanying drawings wherein:

FIG. 2 is an elevational cross-sectional view of the biochemical water filter in the present invention;

FIG. 3 is a cross-sectional view taken along line 3—3 of FIG. 2;

FIG. 4 is a cross-sectional view taken along line 4—4 of FIG. 3;

FIG. 5 is a cross-sectional view taken along line 5—5 of FIG. 3;

FIG. 6 is a magnified view of the section marked 6 in FIG. 5;

DETAILED DESCRIPTION OF THE INVENTION

Figure 1:
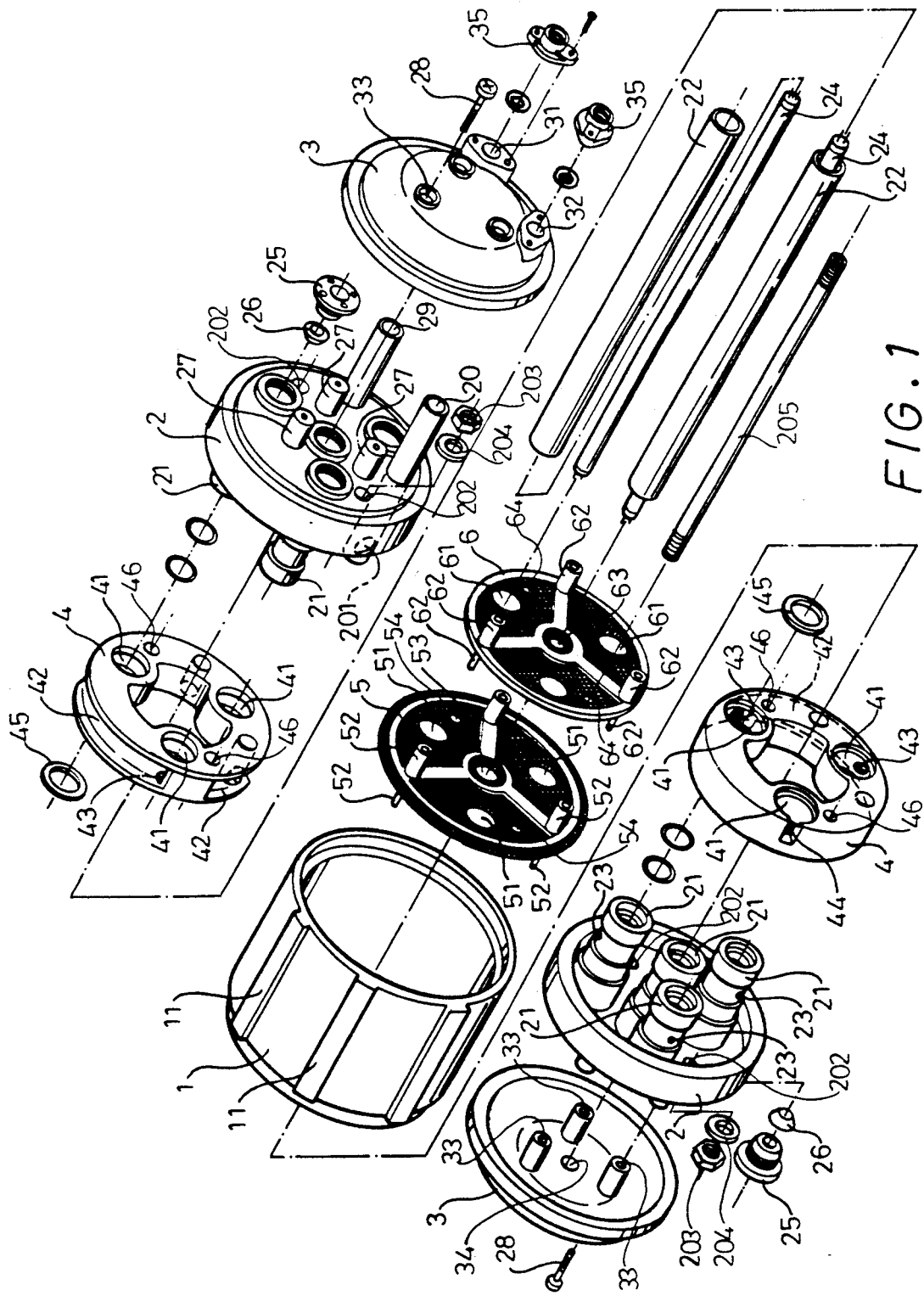
FIG. 1 is an exploded perspective view of a biochemical water filter in the present invention.

The biochemical water filter in the present invention, as shown in FIG. 1, comprises a cylindrical shell 1, two inner caps 2, two outer caps 3, two separating discs 4, a plurality of filtering plates 5, 6, a solar light tube 24 and three ultraviolet light tubes 24 as the main components.

The cylindrical shell 1 can be connected with one another lengthwise to form a long outer shell. Each two shells 1 can be adhered together firmly and tightly with adhesive. The cylindrical shell 1 has a plurality of lengthwise ribs 11 on its circumferential outer surface to reinforce the shell 1.

The two inner caps 2 are fixed with both open sides of the shell 1 by means of adhesive, having several tubular posts 21 extending symmetrically and lengthwise from a left ( or right ) vertical side for ends of four transparent tubes 22 to fit therein. Three of the tubular posts 21 have a hole 23 for water to flow through. The inner caps 2 also have holes 202 for guide tubes 205 to pass therethrough and also through holes 46 in a separating disc 4, holes 54, 64 in filtering plates 5, 6 for combining the inner caps 2 with the separating discs 4 with nuts 203 and washers 205 screwing with the guide tubes 205.

Four transparent tubes 22 are disposed around light tubes 24, one of which is located in the center and three of them are located surrounding the central one. The central light tube 24 is a solar light tube for helping cultivation of nitric bacteria and the other three light tubes are ultraviolet light tubes for sterilization, and the former and the latter are turned on alternately.

Both ends ( or poles ) of each light tubes 24 extend out of the inner caps 2 in the hollow watertight space between the inner caps and the outer caps 3 for electric wires to connect with and the tubular posts 21 are closed with plugs 25 together with an anti-leak gasket 26 put on the inside of the plugs 25 so as to prevent water from seeping into the hollow watertight space between each inner cap 2 and each outer cap 3 lest contact points of each light tubes 24 should be drenched to leak electricity.

The inner caps 2 also have, for being combined with an outer caps 3, posts 27 extending lengthwise from a right ( or left ) vertical side, and the posts 27 have threaded holes for bolts 28 to screw together for combining the inner caps 2 with the outer caps 3. A right-side inner cap 2 has an inflow tube 29 and an out-flow tube 20 extending lengthwise from the right vertical side, the inflow tube 29 fitting in a hole in a valve gasket 31 in the outer cap 3 and the outflow tube 20 fitting in a hole of a valve gasket 32 in the outer cap 3. The outflow tube 20 has a closed end and a hole 201 near the closed end for water to flow into the outflow tube 20.

The outer caps 3 are to be combined with the outside of the inner caps 2, having holes 33 just facing the posts 27 in the inner caps 2 for bolts 28 to extend therein to combine both caps 2, 3 together tightly enough to prevent water from seeping into the space between them, a hole 34 for electric wires to pass through to be connected with a pole of each light tube 24. Other electric wires are pulled through the lead tubes 205, as shown in FIGS. 2, 3, 7 and 8, to be connected with the other poles of the light tubes 24. A right-side outer caps 3 serves as a water inflow side and an outflow side, having valve gaskets 31, 32 combined with joints 35, for connecting with a pump or a water tube for water to flow into and out of this filter.

The two separating disc 4 are respectively combined with the inner side of each inner cap 2, and a plurality of filtering plates 5, 6 are provided spaced apart between two separating discs 4. The separating discs 4 have holes 41 to fit with the tubular posts 21 in the inner caps 2, holes 46 for the guide tubes 205 to pass through to combine the filtering plates 5, 6 through holes 43 in a side wall of the holes 41 and a water guide route 42 communicating with the holes 43 in two of the holes 41. A left side separating disc 4 has an inlet 44 for water coming through filtering plates 5, 6 to flow in and then into a first of the three transparent tubes in which the ultraviolet light tubes 24 are disposed. In addition, anti-leak gaskets 45 are additionally fitted around the holes 41 in arranging the transparent tubes 22 through the holes 41 for preventing water from seeping through to flow into or out of the three transparent tubes in which three ultraviolet light tubes are disposed.

The plurality of filtering plates 5, 6 are made of coarse and rough fiber, having two kinds of different diameters and mounted in the cylindrical shell interposedly, holes 51, 61, 53, 63 for the transparent tubes 22 to pass through, feet 52, 62 extending lengthwise for separating from each other with a proper distance, and holes 54, 64 for two guide tubes 205 to pass through. Then the guide tubes 205 pass through the holes 46 in the separating discs 4 and the holes 202 in the inner caps 2 for nuts 203 with washers 204 to screw with threaded ends of the guide tubes 205 to connect the filtering plates 5, 6 with the separating discs 4 and the inner caps 2 to keep the filtering plates 5, 6 secured in their positions. The guide tubes 205 are used not only to combine the inner caps 2 with the separating discs 4, but also to allow electric wires to pass through their hollow interior. The filtering plates 5 have a larger diameter than the filtering plates 6 and a central hole 53 with several small notches which functions as an inlet for water to go through once the filtering plates 5 have been choked by excessive nitric bacteria or miscellaneous matters fastened thereon. The filtering plates 6 have a central hole 63 tightly fitting around the transparent tube 22, not letting water to go through.

Figure 8:
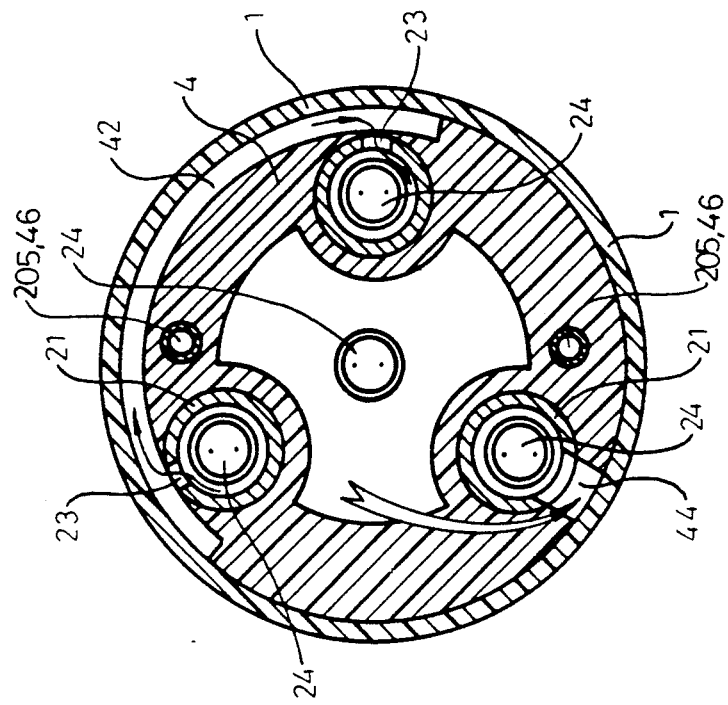
FIG. 8 is a cross-sectional view taken along line 8—8 of FIG. 5.
Figure 7:
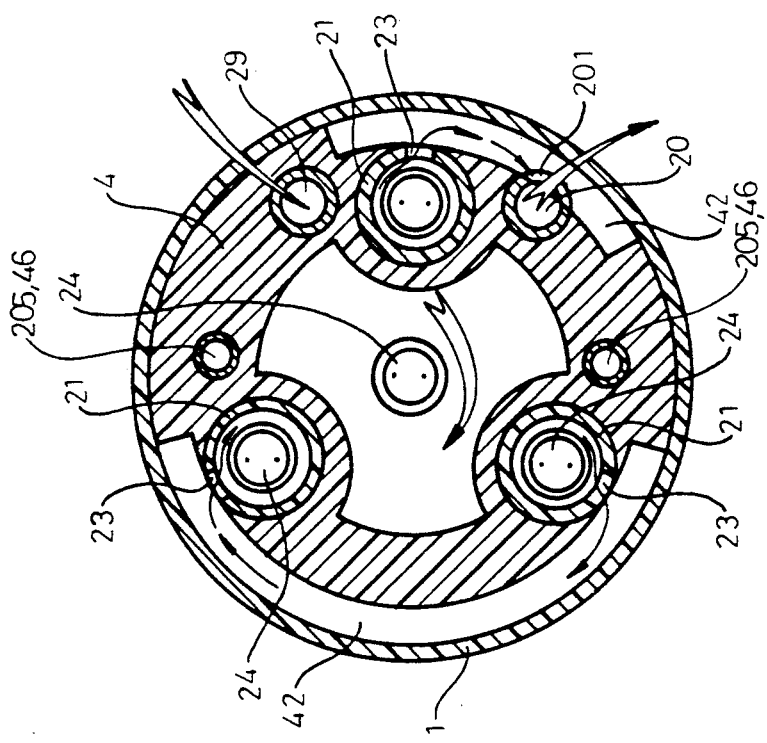
FIG. 7 is a cross-sectional view taken along line 7—7 of FIG. 5.

Referring to FIGS. 2 and 4, water coming from an aquarium is first made to flow through the joint 35 in the outer caps 3 and then through inflow tube 29 in the inner caps 2 and then into the cylindrical shell. Then the water in the cylindrical shell 1 flows through the plurality of the filtering plates 5 and 6 and also through the outer circumferential edges of the filtering plates 5 to reach the inlet 44 in the left-side separating disc 4, as shown in FIGS. 5 and 6. Then the water flows into a first transparent tube 22 through a gap between the tube 22 and an ultraviolet tube 24 receiving the ultraviolet light for sterilization, and then to reach the other end of the first transparent tube 22. Then the water flows through the hole 43 in one of the three holes 41 into one of two guide routes 42, and then into the hole 43 in a second hole 41 of the right-side separating disc 4 and then to the other end of the second transparent tube 22, reaching the hole 43 in the second of the holes 41 of the left side separating disc 4. Then the water flows through the guide route 42 in the left-side separating disc 4 to go into a third transparent tube 22 to pass therethrough to receive the ultraviolet light for sterilization and then through the outflow tube 20 to finally flow out of the outflow joint 35 fixed on the outflow valve gasket 32 flowing back into the aquarium, as shown in FIGS. 7 & 8.

The filtering plates 5, 6 are installed in this filter for nitric bacteria to stick and grow thereon so as to nitrify vagrant bacteria coming to fasten on them. The central solar light tube 24 is provided for cultivation of nitric bacteria and the three ultraviolet light tubes 24 for sterilization, turned on and off intermittently for sterilization of harmful bacteria and cultivation of useful bacteria.

The central solar light tube 24 is used for cultivating, not sterilizing bacteria, and water is made never to flow into the transparent tube 22 in which the solar light tube 24 is disposed. Therefore, the nitric bacteria fastening thereon can propagate, and other vagrant bacteria harmful to fish can also propagate, too, but the latter can be eaten by the former. Generally speaking, the solar light tube 24 is useful to help nitric bacteria perform photosynthesis function. The three ultraviolet light tubes 24 only sterilize the water flowing between themselves and the transparent tubes 22, but not the water outside the transparent tubes 22, which can hamper and enfeeble light coming out of the ultraviolet tubes 24, allowing enfeebled ultraviolet light assist the nitric bacteria on the filtering plates 5, 6 to grow and perform photosynthesis function but not kill them.

The water flowing through between the ultraviolet light tubes 24 and the transparent tubes 22 can be sterilized by the ultraviolet light of these three tubes 24 before flowing into an aquarium, which is then filled with water having no bacteria for benefit of tropical fish growers or breeders using this biochemical water filter.

What is claimed is:

1. A biochemical water filter comprising:

a cylindrical shell defining an axis having first and second open ends with a first and second inner cap fixed in each of said first and second open ends, respectively;

each inner cap having an inner side facing the inside of the shell and an outer side facing opposite the inner side, each of said inner caps having several hollow tubular posts axially extending from the inner side of each inner cap toward the inside of the cylindrical shell, each of said hollow tubular posts communicating with an axial opening through said inner cap and each of said hollow tubular posts having a non-axial hole therein sized to permit the passage of water therethrough, first and second outer caps fixed to said cylindrical shell over said first and second ends, respectively, and covering said outer side of said first and second inner caps respectively and defining between said respective inner and outer caps a watertight space, an inflow tube means and an outflow tube means extending through said first outer and inner caps for feeding water into the shell and flowing filtered water out of the shell, a first, second, third and fourth transparent tube installed in the shell and extending axially from the hollow tubular posts of the first inner cap to the hollow tubular posts of the second inner cap, said tubular posts and transparent tubes being held in watertight relationship with anti-leak gasket means, a first, second and third ultraviolet light tube and a solar light tube respectively disposed inside of said first, second, third and fourth transparent tubes and each light tube extending from said watertight space at the first end through said first inner cap and hollow tubular post, said transparent tube, said second inner cap and hollow tubular post and into said second watertight space at the second end, electrical means for energizing said solar light tube and said ultraviolet light tubes, first and second separating discs mounted inside the shell and each disc having an outer side abutting said inner side of their respective first and second inner caps, said discs defining a central flow area between said discs and said shell, each of said discs having four axial openings for the one solar tube and three ultraviolet tubes to pass therethrough, said first separating disc further including a first opening extending through said first disc for the inflow tube means to pass therethrough an communicate with said central flow area and a second opening on the outer side of said separating disc extending partially through said first disc and communicating with said outflow tube means, a plurality of alternating first and second, axially spaced filtering plates made of coarse material for water to percolate through, said filter plates being located in said central flow area and each of said filtering plates comprises holes to allow for the transparent tubes to pass therethrough, spacer means for holding said alternating first and second filtering plates an axial distance from each other, each of said first plates being of a smaller diameter than each of said second plates and defining a circumferential gap between the outer edge of each first plate and the shell for water to flow through, each of the second plates having an outer diameter which extends to the shell inner wall and further having a central hole for water to flow through, said first separating disc defining an isolated flow path which allows communication between said first and second transparent tubes via said non-axial holes in their respective hollow tubular posts in said first inner cap and a second isolated flow path which allows communication between said third transparent tube and said outflow tube means via the non-axial opening in the hollow tubular post engaged with said third transparent tube;

said second separating disc defining an isolated flow path allowing communication between said central flow area at said second end and the first transparent tube via the non-axial hole in the hollow tubular post of the second inner cap which engages said first transparent tube, and said second disc defining a second isolated flow path which allows communication between said second transparent tube and said third transparent tube via said non-axial holes in their respective hollow tubular posts of the second inner cap whereby water fed through said inflow tube means flows into said flow area, through said alternating filter plates and then into the first transparent tube at the second end, through the first transparent tube back to the first end, through the second transparent tube back to the second end, and through the third transparent tube back to the first end and out of the outflow tube means.

* * * * *